(12) United States Patent
Jeong et al.

(10) Patent No.: US 8,970,511 B2
(45) Date of Patent: Mar. 3, 2015

(54) TOUCH SCREEN PANEL

(75) Inventors: Hwan-Hee Jeong, Yongin (KR); Sung-Ku Kang, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 446 days.

(21) Appl. No.: 12/926,006

(22) Filed: Oct. 20, 2010

(65) Prior Publication Data

US 2011/0234511 A1 Sep. 29, 2011

(30) Foreign Application Priority Data

Mar. 23, 2010 (KR) ........................ 10-2010-0025661

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)
USPC ........................................................ 345/173

(58) Field of Classification Search
USPC ................................. 345/173–178
See application file for complete search history.

(56) References Cited

U.S. PATENT DOCUMENTS

| 2006/0071319 A1 | 4/2006 | Nishimura |
| 2007/0222766 A1 | 9/2007 | Bolender |
| 2008/0264699 A1 | 10/2008 | Chang et al. |
| 2008/0309635 A1 | 12/2008 | Matsuo |
| 2009/0219257 A1 | 9/2009 | Frey et al. |
| 2009/0277695 A1 | 11/2009 | Liu et al. |
| 2010/0026661 A1 | 2/2010 | Teramoto |
| 2010/0073310 A1 | 3/2010 | Liang et al. |
| 2010/0123674 A1* | 5/2010 | Wu et al. .......... 345/173 |
| 2010/0261119 A1* | 10/2010 | Li et al. .......... 430/319 |

(Continued)

FOREIGN PATENT DOCUMENTS

| EP | 1484766 A1 | 8/2004 |
| JP | 2008-310550 A | 12/2008 |
| JP | 4902023 B2 | 1/2012 |

(Continued)

OTHER PUBLICATIONS

European Search Report, dated Mar. 22, 2011, for EP 10193590.6; Jeong, et al.

(Continued)

*Primary Examiner* — Dennis Joseph
(74) *Attorney, Agent, or Firm* — Lee & Morse, P.C.

(57) ABSTRACT

A touch screen panel includes a transparent substrate, a plurality of first connection patterns on the transparent substrate, the plurality of first connection patterns being separated from one another, a plurality of first sensing cells electrically connected along a first direction to the first connection patterns, a plurality of second sensing cells disposed between the first sensing cells and insulated therefrom, the second sensing cells being connected along a second direction by second connection patterns intersecting the first connection patterns, an insulating layer between the first and second connection patterns, edges of the insulating layer being overlapped by the second connection patterns or the second sensing cells, and conductive auxiliary patterns at the edges of the insulating layer, the conductive auxiliary patterns being electrically connected to the second connection patterns and being positioned under the second connection patterns or the second sensing cells.

19 Claims, 3 Drawing Sheets

(56) References Cited

U.S. PATENT DOCUMENTS

2011/0096018 A1* 4/2011 Lee et al. .................. 345/174
2011/0318627 A1 12/2011 Fujiwara et al.

FOREIGN PATENT DOCUMENTS

| | | |
|---|---|---|
| KR | 10-2008-0096352 A | 10/2008 |
| KR | 10-0944519 B1 | 2/2010 |
| KR | 10-1048930 B1 | 7/2011 |
| TW | 200943149 A1 | 10/2009 |
| WO | WO 2010/073466 A1 | 7/2010 |

OTHER PUBLICATIONS

Korean Notice of Allowance in KR 10-2010-0025661, dated May 25, 2011 (Jeong, et al.).
Japanese Office action dated Jun. 5, 2012, (Jeong et al.).
European Patent Gazette 2,369,455 B1 Dated Feb. 20, 2013.
Japanese Office Action dated Feb. 5, 2013.
Taiwanese Notice of Allowance dated Dec. 30, 2014.

* cited by examiner

TOUCH SCREEN PANEL

BACKGROUND

1. Field

Example embodiments relate to a touch screen panel, and more particularly, to a touch screen panel capable of preventing a driving failure caused by static electricity.

2. Description of the Related Art

A touch screen panel is an input device that allows a user's instruction to be input by selecting an instruction content displayed on a screen, e.g., an image display device, with the user's hand or object. Since such a touch screen panel can be substituted for a separate input device connected to an image display device, such as a keyboard or a mouse, its application fields have been gradually extended.

The touch screen panel may be formed on a front face of the image display device to convert a contact position of the user's hand or object into an electrical signal. Here, the user's hand or object may be in direct contact with the touch screen panel at the contact position. Accordingly, the instruction content selected at the contact position is input as an input signal to the image display device.

Touch screen panels may be divided into resistive overlay touch screen panels, photosensitive touch screen panels, capacitive touch screen panels, and the like. For example, a capacitive touch screen panel converts a contact position into an electrical signal by sensing a change in capacitance formed between a conductive sensing cell and an adjacent sensing cell, ground electrode or the like, when a user's hand or object is in contact with the touch screen panel. In order to clearly detect a contact position at a contact surface, a conventional capacitive touch screen panel may include first sensing cells connected along a first direction and second sensing cells connected along a second direction.

SUMMARY

Embodiments are therefore directed to a touch screen panel, which substantially overcomes one or more of the problems due to the limitations and disadvantages of the related art.

It is therefore a feature of an embodiment to provide a touch screen panel capable of preventing a driving failure caused by static electricity.

At least one of the above and other features and advantages may be realized by providing a touch screen panel, including a transparent substrate, a plurality of first connection patterns on the transparent substrate, the plurality of first connection patterns being separated from one another, a plurality of first sensing cells electrically connected along a first direction to the first connection patterns, a plurality of second sensing cells disposed between the first sensing cells and insulated therefrom, the second sensing cells being connected along a second direction by second connection patterns intersecting the first connection patterns, an insulating layer between the first and second connection patterns, edges of the insulating layer being overlapped by the second connection patterns or the second sensing cells, and conductive auxiliary patterns at the edges of the insulating layer, the conductive auxiliary patterns being electrically connected to the second connection patterns and being positioned under the second connection patterns or the second sensing cells.

The conductive auxiliary patterns may be in direct contact with the second connection patterns or the second sensing cells.

The conductive auxiliary patterns may be between the transparent substrate and one of the second connection patterns and the second sensing cells. The conductive auxiliary patterns may be between the insulating layer and the second sensing cells. A portion of the insulating layer may be between the conductive auxiliary pattern and a first connection pattern, bottom surfaces of the insulating layer, conductive auxiliary pattern, and first connection pattern being coplanar.

The conductive auxiliary patterns may be between the transparent substrate and a portion of the insulating layer. The insulating layer may overlap at least two surfaces of the conductive auxiliary pattern, the two surfaces of the conductive auxiliary pattern being in different planes.

A portion of the second connection patterns or the second sensing cells may be between the insulating layer and an adjacent conductive auxiliary pattern, bottom surfaces of the insulating layer and conductive auxiliary pattern being coplanar.

One side of each of the conductive auxiliary patterns may be in contact with one side of the insulating layer. The conductive auxiliary pattern may be in direct contact with the insulating layer and at least one of the second connection patterns and the second sensing cells.

The conductive auxiliary patterns may be formed of the same material in the same layer as the first connection patterns.

The second connection patterns may be integrally formed with each row or column line of the second sensing cells.

The second connection patterns may cross over the insulating layer so that the second sensing cells are connected along the second direction therethrough.

The conductive auxiliary patterns may be disposed beneath the insulating layer at the respective start and end points of a section in which each of the second connection patterns crosses over the insulating layer.

The first connection patterns and the conductive auxiliary patterns may be formed of a transparent electrode material.

The first sensing cells may be positioned in the same layer with the second sensing cells to have separated patterns from one another, and may be connected along the first direction by the first connection patterns.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
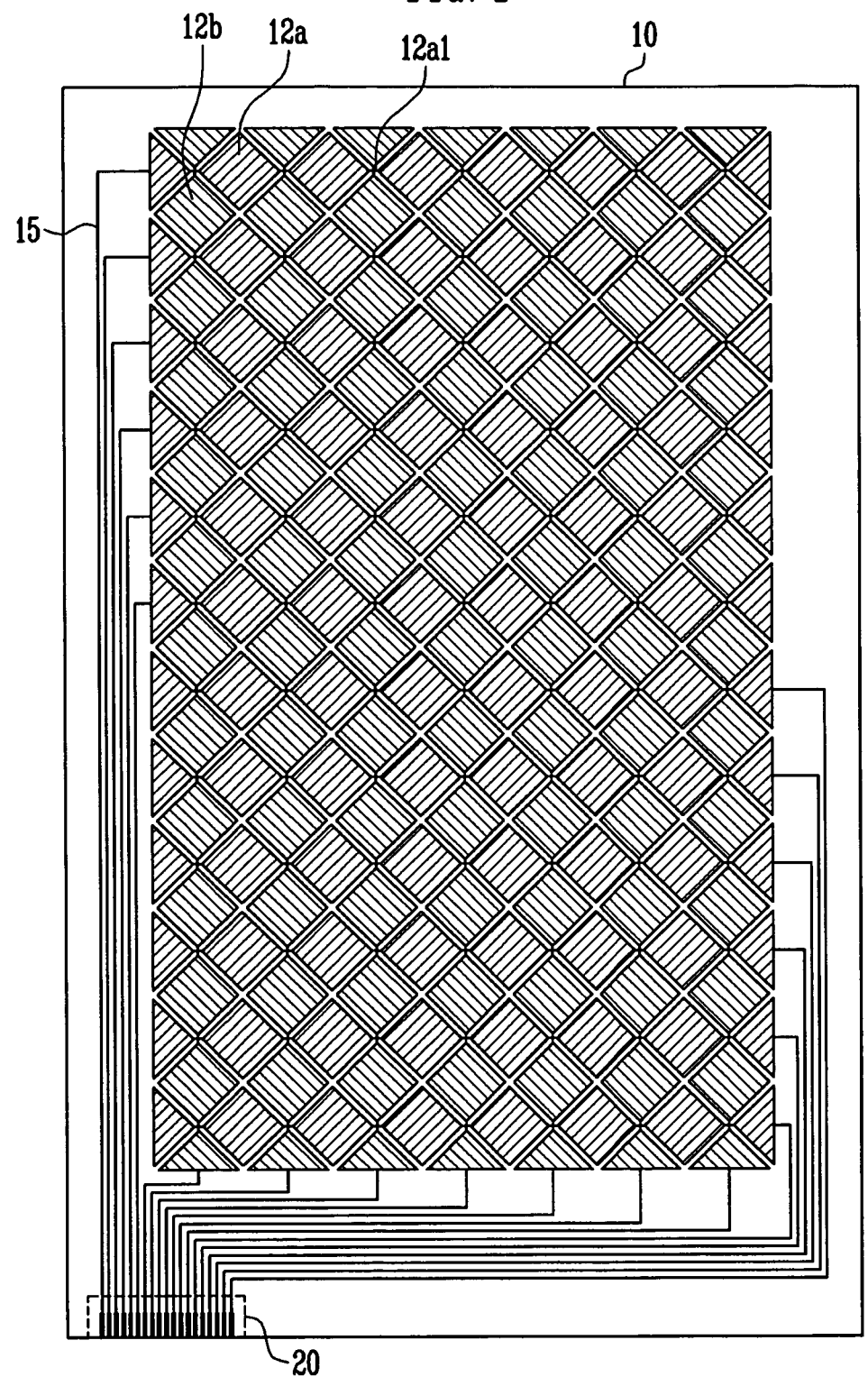
FIG. 1 illustrates a schematic plan view of a touch screen panel according to an embodiment.

Korean Patent Application No. 10-2010-0025661, filed on Mar. 23, 2010, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" or "under" another layer or substrate, it can be directly on or under the other layer or substrate, or intervening layers may also be present. In addition, it will also be understood that when a layer is referred to as being "between" two layers, it can be the only layer between the two layers, or one or more intervening layers may also be present. Also, when a layer is referred to as being "connected to" another element, it can be directly connected to the other element or one or more intervening layers may be present. Like reference numerals refer to like elements throughout.

FIG. 1 illustrates a schematic plan view of a touch screen panel according to an embodiment. Referring to FIG. 1, the touch screen panel according to an embodiment may include a transparent substrate 10, a plurality of first sensing cells 12a and a plurality of second sensing cells 12b formed on the transparent substrate 10, and position detecting lines 15 for connecting the first and second sensing cells 12a and 12b to an external drive circuit through a pad portion 20.

The first sensing cells 12a may be formed to be connected in a first direction, e.g., a row line direction, using a transparent electrode material, e.g., indium tin oxide (ITO). Thus, row lines of the first sensing cells 12a may be connected to some of the position detecting lines 15, respectively.

Like the first sensing cells 12a, the second sensing cells 12b may be formed using a transparent electrode material. The second sensing cells 12b may be disposed in a same layer as the first sensing cells 12a and may be connected to each other along a second direction different from the first direction, e.g., a column line direction. The second sensing cells 12b may be disposed between the first sensing cells 12a, and may be insulated from the first sensing cells 12a. Thus, column lines of the second sensing cells 12b may be connected to some of the position detecting lines 15, respectively. If the first and second sensing cells 12a and 12b are positioned in the same layer, the touch screen panel may have entirely uniform reflexibility.

The position detecting lines 15 may connect the first and second sensing cells 12a and 12b to an external drive circuit (not shown), e.g., a position detecting circuit, through the pad portion 20. The position detecting lines 15 may be disposed outside the outline of the touch screen panel while avoiding a touch active area in which images are displayed. The position detecting lines 15 may have a wide range of selecting materials, and therefore, may be formed of a low-resistance material, e.g., molybdenum (Mo), silver (Ag), titanium (Ti), copper (Cu), aluminum (Al) or molybdenum/aluminum/molybdenum (Mo/Al/Mo), in addition to the transparent electrode material used for forming the first and second sensing cells 12a and 12b.

The aforementioned touch screen panel is a capacitive touch screen panel. If a contact object, e.g., a user's hand or a stylus pen, contact the touch screen panel, a change in capacitance based on a contact position is transferred from the first and second sensing cells 12a and 12b to the external drive circuit via the position detecting lines 15 and the pad portion 20. Then, the change in capacitance is converted into an electrical signal by X and Y input processing circuits (not shown) and the like, so that the contact position is detected.

Figure 2:
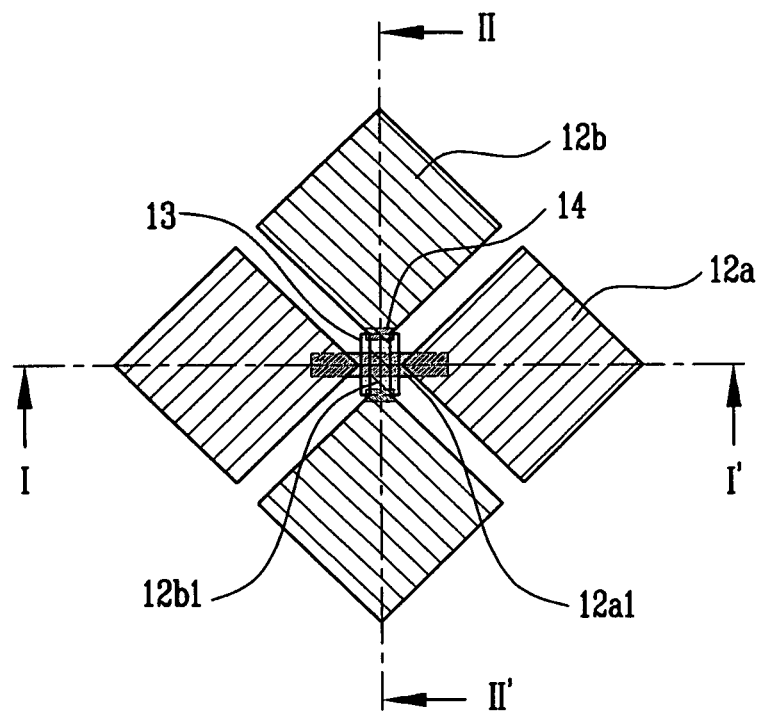
FIG. 2 illustrates an enlarged view of sensing cells and connection patterns in FIG. 1.
Figure 3:
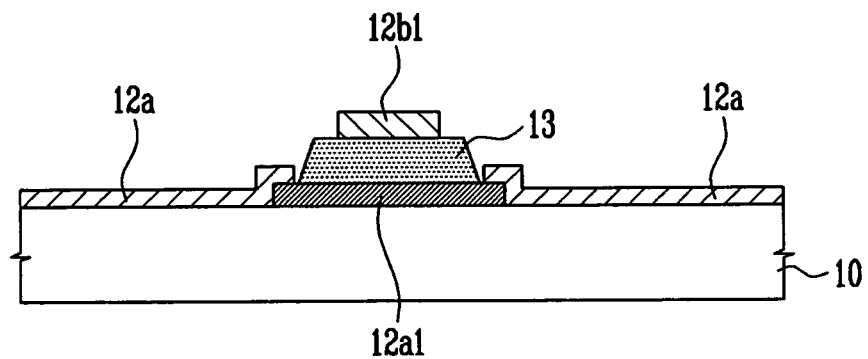
FIG. 3 illustrates a cross-sectional view taken along line I-I' of FIG. 2.

FIG. 2 illustrates an enlarged view of sensing cells and connection patterns shown in FIG. 1. FIG. 3 illustrates a cross-sectional view taken along line I-I' of FIG. 2, and FIG. 4 illustrates a cross-sectional view taken along line II-II' of FIG. 2.

Figure 4:
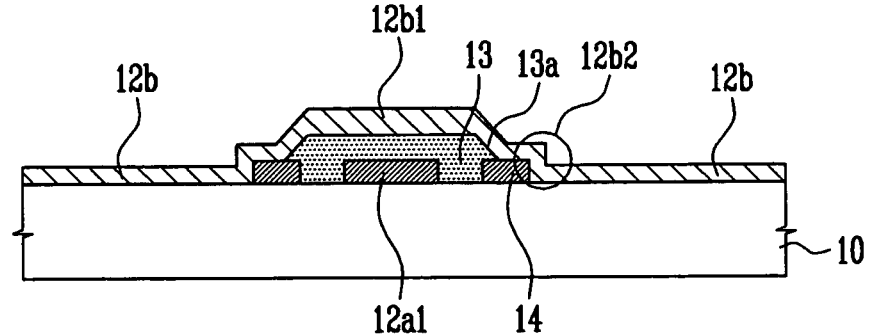
FIG. 4 is a cross-sectional view taken along line II-IF of FIG. 2.

For convenience of illustration, only a pair of first and second connection patterns is shown in FIGS. 2 to 4. However, the same structure can be applied to other first and second connection patterns, and therefore, a plurality of first and second connection patterns will be inclusively described. Thus, the first connection pattern and the second connection pattern will be designated as a plurality of first connection patterns and a plurality of second connection patterns.

Referring to FIG. 2, the first sensing cells 12a may be positioned in the same layer as the second sensing cells 12b to have separated patterns from one another, e.g., the first sensing cells 12a may be spaced apart from adjacent second sensing cells 12b. The first sensing cells 12a may be connected to each other along the first direction by first connection patterns 12a1.

Like the first sensing cells 12a, the first connection patterns 12a1 may be patterned to have separated patterns from one another. As shown in FIG. 1, a plurality of first connection patterns 12a1 may be disposed along a line in the first direction, e.g., each of the row lines.

The second sensing cells 12b may be disposed between the first sensing cells 12a to be insulated from the first sensing cells 12a. The second sensing cells 12b may be connected to each other along the second direction by second connection patterns 12b1. The second connection patterns 12b1 may intersect with the first connection patterns 12a1 with an insulating layer 13 interposed therebetween.

The second connection patterns 12b1 may be patterned to be integrally formed with the second sensing cells 12b, e.g., in a same patterning process. Therefore, the second sensing cells 12b may be connected along the second direction by the second connection patterns 12b1. As an example, the second connection patterns 12b1 may be integrally formed with each of the column lines of the second sensing cells 12b. It is noted, however, that example embodiments are not limited thereto. As another example, the second connection patterns 12b1 may be integrally formed with each row line of the second sensing cells 12b. In this case, the first connection patterns 12a1 on each column line may be connected to one another.

The first and second connection patterns 12a1 and 12b1 and the first and second sensing cells 12a and 12b will be described in detail with reference to FIGS. 3-4. As shown in FIG. 3, the first connection pattern 12a1 may be formed on the transparent substrate 10 to have separated patterns from one another. The insulating layer 13 may be positioned on the first connection patterns 12a1 to partially expose regions of the first connection patterns 12a1, e.g., to expose edges of the first connection patterns 12a1. The exposed regions of the first connection patterns 12a1 may define contact regions for the first connection patterns 12a1 and the first sensing cells 12a.

The first sensing cells 12a may be electrically connected to the first connection patterns 12a1 through the exposed regions of the first connection patterns 12a1, e.g., the first sensing cells 12a may directly contact the first connection patterns 12a1 via the exposed regions of the first connection patterns 12a1. Thus, the first sensing cells 12a may be connected along the first direction.

The second sensing cells 12b may be disposed between the first sensing cells 12a in the same layer as the first sensing cells 12a. As shown in FIG. 4, the second sensing cells 12b may be connected along the second direction by the second connection patterns 12b1 connected to one another via the top of the insulating layer 13. The second sensing cells 12b may be integrally formed with the second connection patterns 12b1. In this case, the second sensing cells 12b and the second connection patterns 12b1 may be patterned from a patterning process. It is noted, however, that example embodiments are not limited thereto, e.g., the second sensing cells 12b and the second connection patterns 12b1 may be formed separately from each other in different layers so as to be electrically connected to each other through contact holes and the like.

However, as a width of the second sensing cells 12b narrows, the second connection patterns 12b1 may be implemented at edges of the regions in which the second sensing cells 12b and the second connection patterns 12b1 (or the integrally formed second sensing cells 12b and the second connection patterns 12b1) overlap the insulating layer 13. As resistance at boundary portions between the second sensing cells 12b and the second connection patterns 12b1 that cross over, e.g., overlap, the insulating layer 13 may locally increase, the boundary portions between the second sensing cells 12b and the second connection patterns 12b1 may be easily damaged by static electricity.

Therefore, in order to prevent damage caused by static electricity, the touch panel according to example embodiments may include conductive auxiliary patterns 14, as illustrated in FIGS. 2 and 4. The conductive auxiliary patterns 14 may be electrically connected to the second sensing cells 12b and the second connection patterns 12b1, and may be formed at edges of the regions in which the insulating layer 13 overlaps the second sensing cells 12b and/or the second connection patterns 12b1.

In detail, as illustrated in FIG. 4, the conductive auxiliary patterns 14 may be formed in a same layer as the first and second sensing cells 21a and 12b, e.g., the conductive auxiliary patterns 14 and the second sensing cells 12b may be directly on the transparent substrate 10. In other words, the conductive auxiliary patterns 14 may be in a same layer as the first connection patterns 12a1, and may be spaced apart from the first connection patterns 12a1 along the second direction, e.g., portions of the insulating layer 13 may be positioned on the transparent substrate 10 between the first connection pattern 12a1 and each respective conductive auxiliary pattern 14. For example, the conductive auxiliary patterns 14 may be positioned adjacent to edges 13a of the insulating layer 13, so the second sensing cells 12b or the second connection patterns 12b1 may overlap the conductive auxiliary patterns 14 and the edges 13a of the insulating layer 13.

For example, the insulating layer 13 may completely overlap the first connection pattern 12a1 and portions of the conductive auxiliary patterns 14, e.g., the insulating layer 13 may overlap at least a portion of an upper surface of each conductive auxiliary pattern 14. Therefore, as edges 13a of the insulating layer 13 may be positioned between the second connection pattern 12b1 and upper surfaces of the conductive auxiliary patterns 14, the conductive auxiliary patterns 14 may overlap the edges 13a of the insulating layer 13, i.e., respective start and end points of a section in which each of the second connection patterns 12b1 crosses over a top of the insulating layer 13. The conductive auxiliary patterns 14 may be formed to be electrically connected to the second sensing cells 12b or the second connection patterns 12b1, and may be in direct contact with the second sensing cells 12b or the second connection patterns 12b1. For example, the conductive auxiliary pattern 14 may be positioned to overlap a connection region 12b2 between the second sensing cells 12b and the second connection patterns 12b1, thereby contacting the second sensing cells 12b, the second connection patterns 12b1, and the insulating layer 13.

As described above, the present embodiment may include the conductive auxiliary patterns 14 at the edges of the regions in which the insulating layer 13 overlaps the second sensing cells 12b or the second connection patterns 12b1. The conductive auxiliary patterns 14 may be electrically connected to the second sensing cells 12b or the second connection patterns 12b1 beneath the second sensing cells 12b or the second connection patterns 12b1.

Therefore, it may be possible to prevent or substantially minimize rapid resistance increase at portions of the second connection patterns 12b1 via the conductive auxiliary patterns 14. Further, it may be possible to decrease the resistance of the column lines of which second sensing cells 12b are connected by the second connection patterns 12b1. Accordingly, it may be possible to prevent or substantially minimize driving failure of the touch screen panel, e.g., a driving failure caused by static electricity, and to enhance driving characteristic of the touch screen panel.

The conductive auxiliary patterns 14 may be formed of the same material in the same layer as the first connection patterns 12a1 in the process of forming the first connection patterns 12a1. In this case, the conductive auxiliary patterns 14 may be easily formed without performing an additional process.

The first connection patterns 12a1 and the conductive auxiliary patterns 14 may be formed using a transparent electrode material, e.g., ITO. Therefore, it may be possible to prevent or substantially minimize visibility of the first connection patterns 12a1 and the conductive auxiliary patterns 14, and to enhance the adhesion of the first connection patterns 12a1 and the conductive auxiliary patterns 14 to the insulating layer 13 positioned thereon.

Accordingly, the insulating layer 13 may be formed to have a gentler slope, so that when a transparent electrode material for forming the second connection patterns 12b1 and the second sensing cells 12b is grown on the insulating layer 13, the stack coverage of the transparent electrode material is satisfactory, thereby preventing a local increase of resistance.

Although the conductive auxiliary patterns 14 are illustrated in FIG. 4 as being disposed beneath a portion of the insulating layer 13, other configurations of the conductive auxiliary patterns 14 with respect to the insulating layer 13 are within the scope of the exemplary embodiments. That is, the conductive auxiliary patterns 14 may be variously modified so as to enhance the film growth characteristics of the second connection patterns 12b1 and the second sensing cells 12b to be formed thereon and to prevent a rapid increase of the resistance at portions in which the second connection patterns 12b1 are formed. For example, their positions, materials or the like may be modified.

Figure 5:
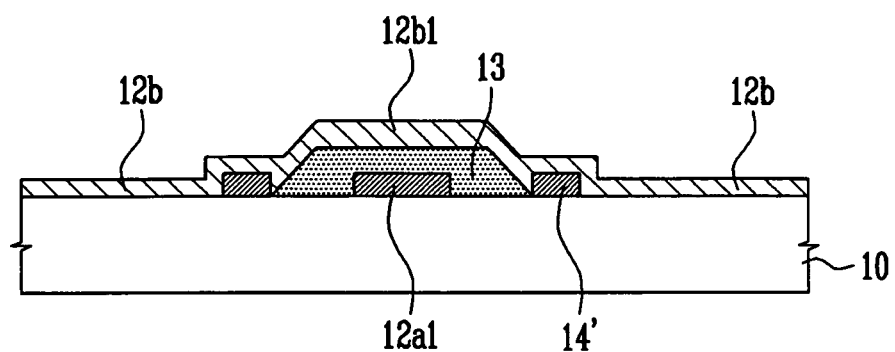
FIG. 5 illustrates a cross-sectional view of sensing cells and connection patterns according to another embodiment.
Figure 6:
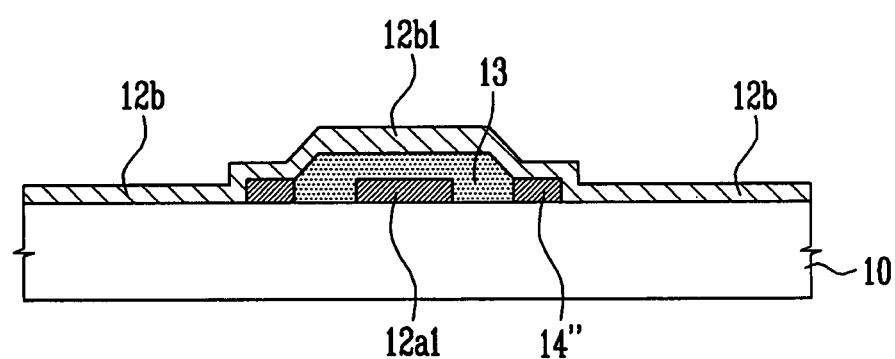
FIG. 6 illustrates a cross-sectional view of sensing cells and connection patterns according to another embodiment.

FIG. 5 illustrates a cross-sectional view of another example embodiment of conductive auxiliary patterns 14', and FIG. 6 illustrates a cross-sectional view of still another example of conductive auxiliary patterns 14". FIGS. 5 and 6 illustrate cross-sectional views taken along the direction of line II-II' of FIG. 2. Parts of FIGS. 5 and 6 similar or identical to those of FIG. 4 are designated by like reference numerals and their detailed descriptions will not be repeated.

Referring to FIG. 5, the conductive auxiliary patterns 14' may be positioned at edges of regions in which the insulating layer 13 overlaps the second sensing cells 12b or the second connection patterns 12b1. The conductive auxiliary patterns 14' may be disposed adjacent to the insulating layer 13, e.g., a portion of the second connection pattern 12b1 may be disposed between the insulating layer 13 and each respective conductive auxiliary pattern 14'. For example, the second connection pattern 12b1 may overlap an entire length of the insulating layer 13 along the second direction to contact the transparent substrate 10, so the conductive auxiliary pattern 14' may be enclosed by the second connection pattern 12b1 contacting the transparent substrate 10, the second sensing cells 12b, and the transparent substrate 10.

Referring to FIG. 6, the conductive auxiliary patterns 14" may be positioned at edges of regions in which the insulating layer 13 overlaps the second sensing cells 12b or the second connection patterns 12b1. The conductive auxiliary patterns 14" may be disposed adjacent to the insulating layer 13 and in contact therewith. That is, the conductive auxiliary patterns 14" may be formed so that one side of each of the conductive auxiliary patterns 14" may contact one side of the insulating layer 13.

In the embodiments illustrated in FIGS. 5 and 6, when a transparent electrode material for forming the second connection patterns 12b1 and the second sensing cells 12b is grown on the conductive auxiliary patterns 14' and 14" and the insulating layer 13, step differences may be compensated by the conductive auxiliary patterns 14' and 14". Therefore, the transparent electrode material may be grown to have a gentle slope. The conductive auxiliary patterns 14' and 14" may be electrically connected to the second connection patterns 12b1 and the second sensing cells 12b, so that it may be possible to prevent or substantially minimize a rapid increase of the resistance at the portions in which the second connection patterns 12b1 are formed and to decrease the resistance of the column lines of which second sensing cells 12b are connected by the second connection patterns 12b1. Accordingly, it may be possible to prevent the driving failure of the touch screen panel caused by static electricity, and to enhance the driving characteristic of the touch screen panel.

The conductive auxiliary patterns 14' and 14" may be formed of the same material in the same layer as the first connection patterns 12a1 for the purpose of efficiency in processes. However, example embodiments are not limited thereto. For example, the conductive auxiliary patterns 14' and 14" may be formed of a different material from the first connection patterns 12a1 or may be formed to have a different height from the first connection patterns 12a1. Alternatively, the conductive auxiliary patterns 14' and 14" may be formed to have a stacked structure in which two or more different layers are stacked.

As described above, according to example embodiments, a touch panel may include conductive auxiliary patterns at edges of regions in which the insulating layer overlaps the second connection patterns or the second sensing cells. The conductive auxiliary patterns may be electrically connected the second connection patterns or the second sensing cells, and may be positioned beneath the second connection patterns or the second sensing cells. Accordingly, it may be possible to prevent a rapid increase of the resistance at portions in which the second connection patterns are formed, thereby preventing the driving failure of the touch screen panel caused by static electricity.

In contrast, when conventional first and second connection patterns that connect respective first and second sensing cells have narrower widths than the respective sensing cells, resistance of the first and second patterns may be relatively increased. Accordingly, when static electricity is induced from the exterior of the touch screen panel, Joule heating may be concentrated on intersection portions of the first and second connection patterns, thereby triggering heat loss or the like. Therefore, a driving failure of the touch screen panel may be caused by the heat loss or the like.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
a transparent substrate;
a plurality of first connection patterns on the transparent substrate, the plurality of first connection patterns being separated from one another;
a plurality of first sensing cells electrically connected along a first direction to the first connection patterns;
a plurality of second sensing cells disposed between the first sensing cells and insulated therefrom, the second sensing cells being connected along a second direction by second connection patterns intersecting the first connection patterns;
an insulating layer between the first and second connection patterns, edges of the insulating layer being overlapped by the second connection patterns or the second sensing cells;
conductive auxiliary patterns only at the edges of the insulating layer, the conductive auxiliary patterns being electrically connected to the second connection patterns and being positioned under the second connection patterns and under at least a part of or the second sensing cells,
wherein the conductive auxiliary patterns include a same material as and are in a same layer as the first connection patterns and
wherein bottom surfaces of the conductive auxiliary patterns and of the first connection patterns face a same direction and are level, a portion of the insulating layer being between a bottom surface of a first connection pattern and a bottom surface of an adjacent conductive auxiliary pattern, and the second connection patterns being above each of the conductive auxiliary patterns, the first connection patterns, and the insulating layer.

2. The touch screen panel as claimed in claim 1, wherein the conductive auxiliary patterns are in direct contact with the second connection patterns or the second sensing cells.

3. The touch screen panel as claimed in claim 1, wherein the conductive auxiliary patterns are between the transparent substrate and one of the second connection patterns and the second sensing cells.

4. The touch screen panel as claimed in claim 3, wherein the conductive auxiliary patterns are between the insulating layer and the second sensing cells.

5. The touch screen panel as claimed in claim 3, wherein a portion of the insulating layer is between the conductive auxiliary pattern and a first connection pattern, bottom surfaces of the insulating layer, conductive auxiliary pattern, and first connection pattern being coplanar.

6. The touch screen panel as claimed in claim 1, wherein the conductive auxiliary patterns are between the transparent substrate and a portion of the insulating layer.

7. The touch screen panel as claimed in claim 6, wherein the insulating layer overlaps at least two surfaces of the conductive auxiliary pattern, the two surfaces of the conductive auxiliary pattern being in different planes.

8. The touch screen panel as claimed in claim 1, wherein a portion of the second connection patterns or the second sensing cells is between the insulating layer and an adjacent conductive auxiliary pattern, bottom surfaces of the insulating layer and conductive auxiliary pattern being coplanar.

9. The touch screen panel as claimed in claim 1, wherein one side of each of the conductive auxiliary patterns is in contact with one side of the insulating layer.

10. The touch screen panel as claimed in claim 9, wherein the conductive auxiliary pattern is in direct contact with the insulating layer and at least one of the second connection patterns and the second sensing cells.

11. The touch screen panel as claimed in claim 1, wherein the second connection patterns are integral with each row or column line of the second sensing cells.

12. The touch screen panel as claimed in claim 11, wherein the integral structure of the second connection patterns with the second sensing cells overlaps at least two different surfaces of each conductive auxiliary pattern.

13. The touch screen panel as claimed in claim 1, wherein the second connection patterns cross over the insulating layer, the second sensing cells being connected along the second direction through the second connection patterns.

14. The touch screen panel as claimed in claim 13, wherein the conductive auxiliary patterns are disposed beneath the insulating layer at respective start and end points of a section in which each of the second connection patterns crosses over the insulating layer.

15. The touch screen panel as claimed in claim 1, wherein the first connection patterns and the conductive auxiliary patterns include a transparent electrode material.

16. The touch screen panel as claimed in claim 1, wherein the first sensing cells are positioned in a same layer with the second sensing cells and are connected along the first direction by the first connection patterns.

17. The touch screen panel as claimed in claim 1, wherein the conductive auxiliary patterns extend only along short edges of the insulating layer, a longitudinal direction of the conductive auxiliary patterns extending along the first direction.

18. The touch screen panel as claimed in claim 1, wherein a longitudinal direction of each conductive auxiliary pattern is parallel to a longitudinal direction of the first connection patterns, each first connection pattern being between two conductive auxiliary patterns.

19. The touch screen panel as claimed in claim 1, wherein the conductive auxiliary patterns and the first connection patterns are positioned at a same distance from the transparent substrate, the conductive auxiliary patterns being separated from the first connection patterns by the insulating layer.

* * * * *